United States Patent

Lillbacka et al.

[11] Patent Number: 5,855,376
[45] Date of Patent: Jan. 5, 1999

[54] TOOL COUPLING WITH MEANS FOR CENTERING AND CLAMPING

[75] Inventors: Jorma Lillbacka, Härmä; Riku Rantala, Nokia, both of Finland

[73] Assignee: Balaxman OY, Kauhava, Finland

[21] Appl. No.: 737,143

[22] PCT Filed: Apr. 27, 1995

[86] PCT No.: PCT/FI95/00230

§ 371 Date: Oct. 30, 1996

§ 102(e) Date: Oct. 30, 1996

[87] PCT Pub. No.: WO95/30504

PCT Pub. Date: Nov. 16, 1995

[30] Foreign Application Priority Data

May 5, 1994 [FI] Finland ................................. 942065

[51] Int. Cl.[6] ........................ B23B 31/02; B23B 29/04; B23B 3/12; B23Q 3/12
[52] U.S. Cl. ........................ 279/133; 409/233; 409/234; 82/160
[58] Field of Search ............................. 279/16, 133, 141; 409/233, 234; 82/160

[56] References Cited

U.S. PATENT DOCUMENTS

| | | | |
|---|---|---|---|
| 2,893,291 | 7/1959 | Hollis | 409/233 |
| 5,201,621 | 4/1993 | McMurty et al. | 409/233 |
| 5,322,304 | 6/1994 | Rivin | 409/234 |
| 5,346,344 | 9/1994 | Kress et al. | 409/234 |

FOREIGN PATENT DOCUMENTS

| | | |
|---|---|---|
| 0 022 796 | 1/1981 | European Pat. Off. . |
| 0 026 751 | 4/1981 | European Pat. Off. . |
| 0 310 942 | 4/1989 | European Pat. Off. . |
| 0 430 572 | 6/1991 | European Pat. Off. . |
| 0 507 147 | 10/1992 | European Pat. Off. . |
| 42 23 158 | 3/1993 | Germany . |
| 42 18 142 | 12/1993 | Germany . |

*Primary Examiner*—Steven C. Bishop
*Attorney, Agent, or Firm*—Louis Woo

[57] ABSTRACT

The invention relates to a fixing mechanism for a tool for treatment of a material, such as machining. The fixing mechanism comprises a combination of a tool (1), its frame (2) and tool holder (3) in the frame of a machine tool. At least one of the connecting surfaces (r, 7) in the tool frame (2) and in the tool holder (3) in the frame of the machining tool, extending mainly in the mounting direction, is shaped as a curved surface. The first contact surface (6) in connection with the tool frame (2) and the second contact surface (8) in the tool holder (3) are adjusted substantially in a direction perpendicular to the mounting direction, to be placed against each other in the operational position of the fixing mechanism, in order to transmit machining force between the tool frame (2) and the tool holder (3).

12 Claims, 3 Drawing Sheets

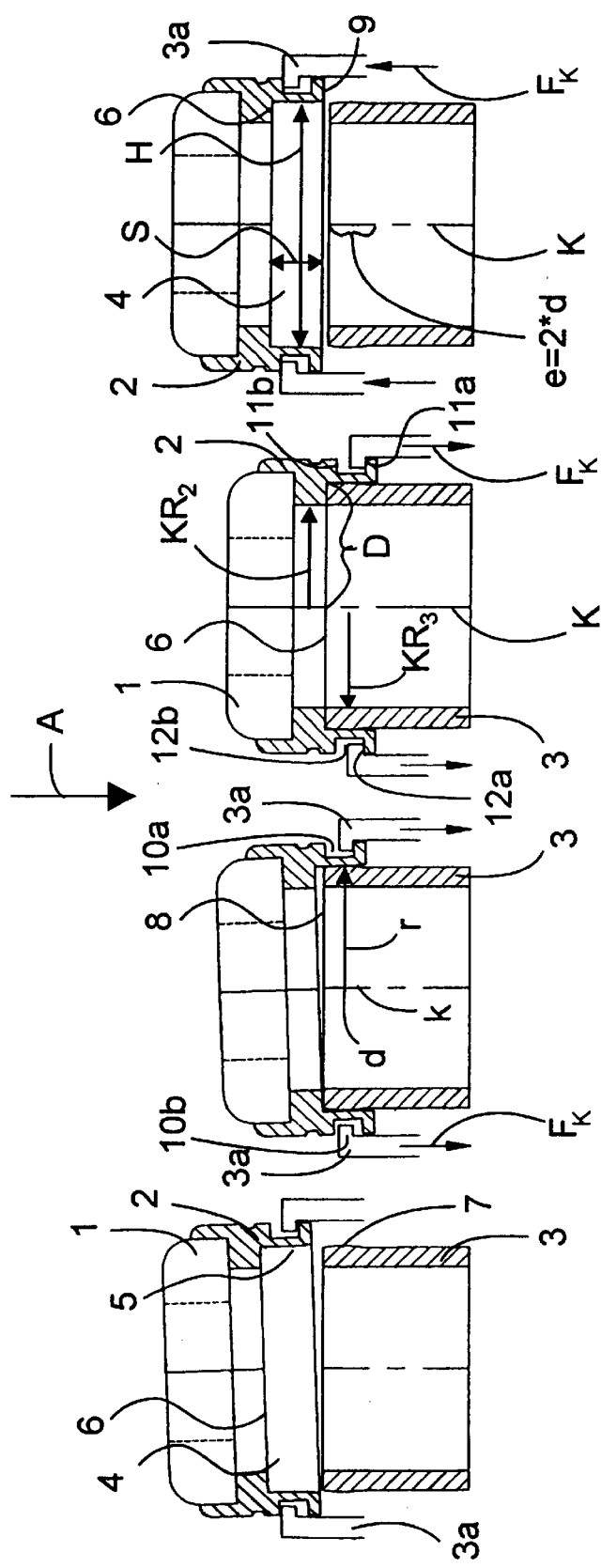

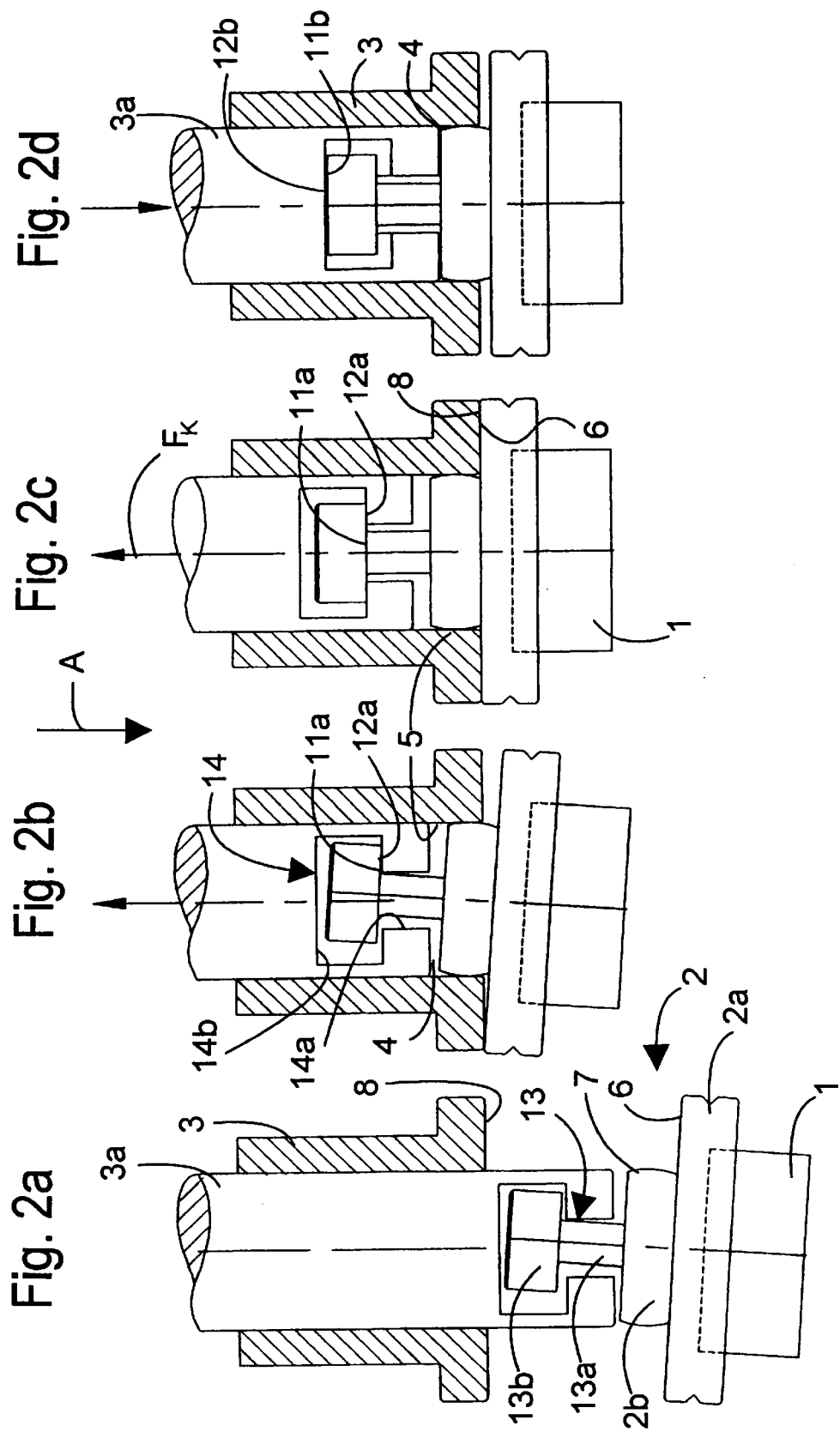

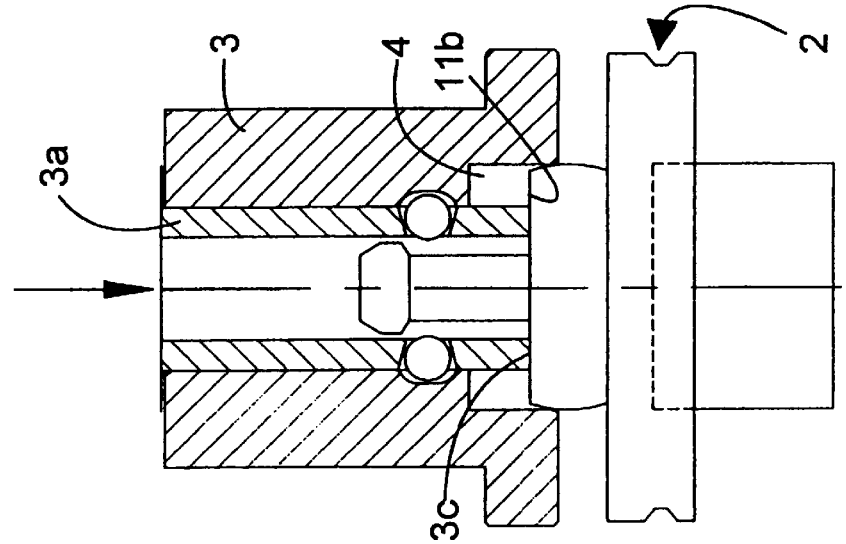
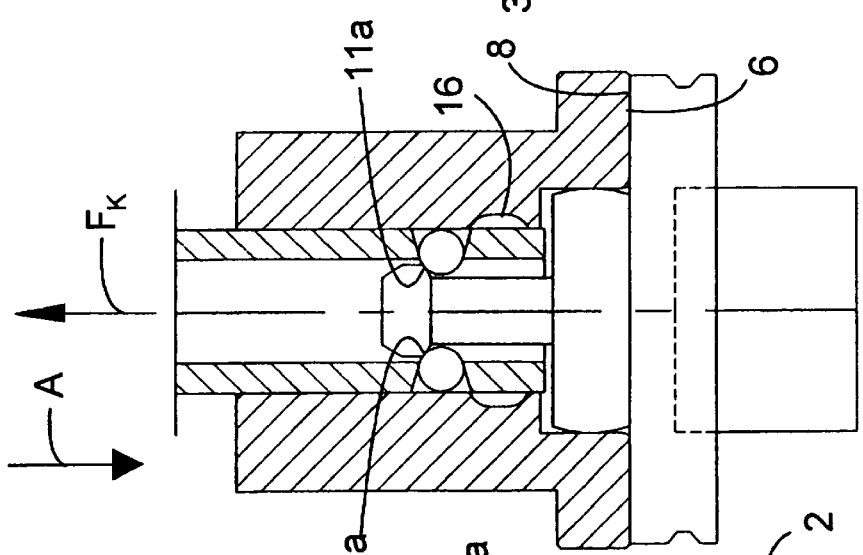
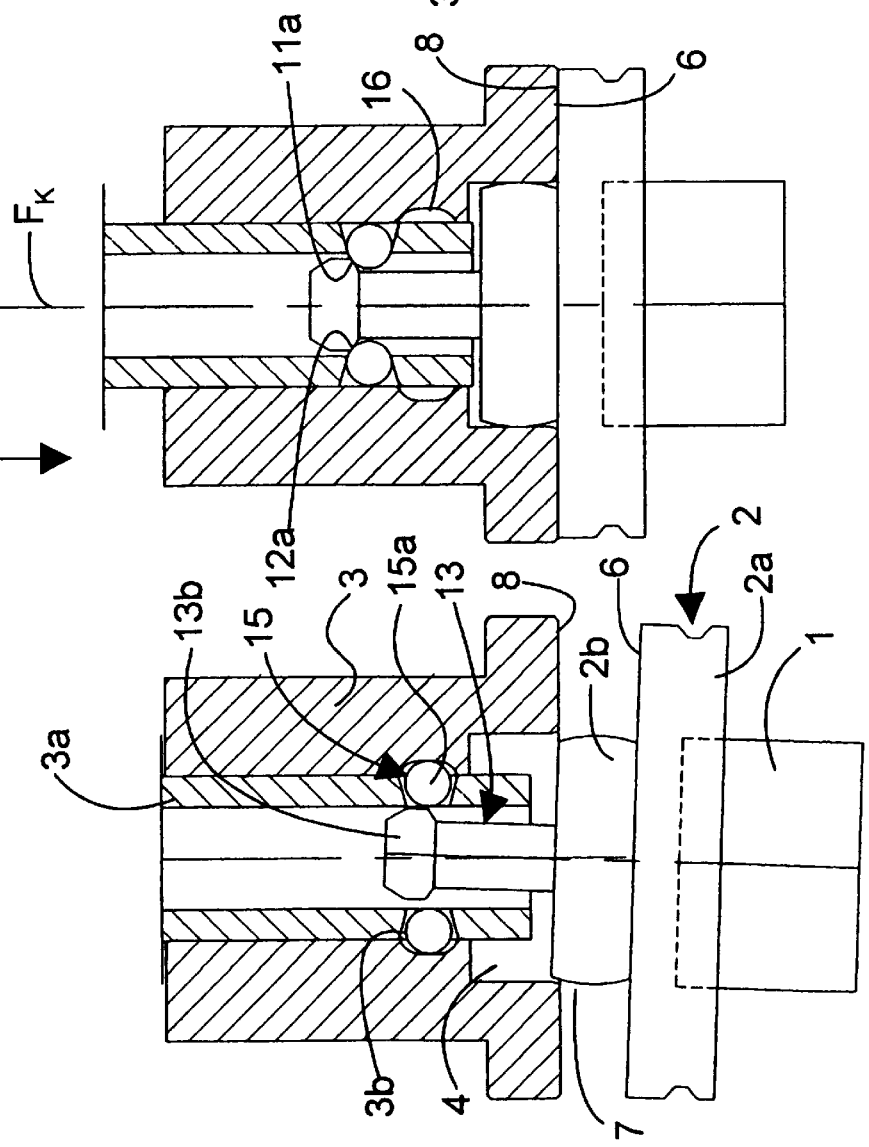

TOOL COUPLING WITH MEANS FOR CENTERING AND CLAMPING

THE FIELD OF INVENTION

The invention relates to a fixing mechanism for a tool for treatment of a material, such as machining, wherein the fixing mechanism comprises a combination of a tool, its frame and tool holder in the frame of a machine tool.

The fixing mechanism according to the invention can be applied in a wide range of technology, including machining by chipping, such as milling, reaming, drilling, turning, etc. of wood, plastics, metal, etc. as the material for machining. The fixing mechanism can be used in various types of robot applications for production, in the exchange of grippers or the like in other automatic devices, such as apparatus for transfer and treatment of pieces, in pneumatic tools, etc., wherein exchange of tools required for different kinds of operations is necessary for carrying out various operations.

Further, the above fixing mechanism for a tool is particularly advantageous for use in cutting, punching, moulding and forming work, particularly in machining of metal sheets in so-called sheet machining centers.

In machining of this kind, the direction of fixing a tool is a linear movement whereby the machining or forming blade edge directs the machining force to the sheet, usually in a direction perpendicular to the main direction of the sheet, the sheet being placed between the tool and its counterpart, i.e. a cushion. The tool-fixing mechanism according to the invention can be used for fixing both the actual machining tool and its counterpart, i.e. the so-called cushion, to the tool holder in the frame of the machine tool.

BACKGROUND OF THE INVENTION

According to prior art, it is common to use a so-called conic fit, i.e. a Morse conic fit, for fixing a tool, whereby the tool frame and the tool holder are joined to each other by a fixing movement in their axial direction, the release being effected in a corresponding manner in the axial direction. In particular, the conic fit has the disadvantage that the connecting surfaces very easily tend to be clamped too much against each other, particularly under effect of axial forces. For this reason, many systems presently in use comprise special release mechanisms for releasing clamped conic surfaces in connection with the exchange of a tool. As a natural result, the costs of fixing mechanisms required by tool settings are increased, also, the mechanisms are relatively complex and therefore subject to disturbances during the actual machining operation and particularly during the exchange of a tool.

SUMMARY OF THE INVENTION

As to the prior art, reference is further made to the publications DE-4218142, EP-22796 and DE-4223158, which disclose tool-fixing mechanisms using interfaces with totally curved surfaces.

It is an aim of the present invention to provide an improved fixing mechanism for a tool, wherein the purpose of the invention is to improve the prior art in the field for a wide range of applications. For achieving these aims, the tool-fixing mechanism of the invention is primarily characterized in that at least one of the connecting surfaces in the tool frame and in the tool holder in the frame of the machining tool, extending mainly in the mounting direction, is shaped as a curved surface and that the first contact surface in connection with the tool frame and the second contact surface in the tool holder are adjusted to be placed against each other in the operational position of the fixing mechanism, in order to transmit machining force between the tool frame and the tool holder. Using the solution presented above, a very simple and secure fixing mechanism is achieved. The tool and its frame can be placed in the tool holder by a very simple movement defined by the curved surface, wherein the connecting surfaces are placed substantially against each other and the contact surfaces, extending in a direction substantially perpendicular to the mounting direction, in the final mounting phase transmit the machining force in the mounting direction between the tool, the tool frame and the tool holder and/or transmit the machining force by means of a frictional contact in a direction substantially perpendicular to the mounting direction.

Some advantageous embodiments of the fixing mechanism according to the invention are presented in the appended dependent claims.

BRIEF DESCRIPTION OF THE FIGURES

In the following description, the invention will be disclosed with reference to series of figures shown in the appended drawings and illustrating some advantageous embodiments of the fixing mechanism according to the invention. In the drawings, FIG. 1$a$ shows parts of the tool according to the first embodiment, separate in a cross-sectional view in the mounting direction at the beginning of fixing the tool, FIG. 1$b$ is a cross-sectional view in the mounting direction, showing the stage of mounting the tool and its frame in connection with the tool holder in the frame of the machine tool, FIG. 1$c$ is also a cross-sectional view in the mounting direction, showing the tool, the tool frame, and the tool holder in the frame of the machine tool in the functional position of the fixing mechanism, FIG. 1$d$ shows the stage of releasing the tool and the tool frame in the above-mentioned sectional view, FIGS. 2$a$–$d$ show another embodiment of the fixing mechanism, corresponding to the stages shown in FIGS. 1$a$–$d$, and FIGS. 3$a$–$c$ show essential stages of FIGS. 1$a$–$d$ of a third embodiment of the invention.

DETAILED DESCRIPTION OF THE INVENTION

With reference to FIGS. 1$a$ to 1$d$, the fixing mechanism comprises as main parts a tool 1, a tool frame 2 for fixing the tool 1, as well as a bushing-like tool holder 3 and clamps 3$a$. In this embodiment, the tool 1 is a cushion or the like, used as a counterpart for a cutting, punching, molding or forming blade.

A connecting element 4 in the tool frame 2 is an inlay with a cylindrical shape. It comprises a first connecting surface 5 extending substantially in the mounting direction and being a straight line in the mounting direction (arrow A), and further a first contact surface 6, i.e. a bottom surface, joining the first connecting surface and being substantially perpendicular to the mounting direction. In the present embodiment, the first contact surface 6 is in a ring-like flange part extending from the first connecting surface 5, from its end facing the bottom of the connecting element 4, towards the center line K of the fixing mechanism, wherein, as shown in FIG. 1$c$, the central openings $KR_2$ and $KR_3$ of both the tool frame 2 and the holder 3 are equal in size and concentric, making any movements of additional parts possible inside the holder 3, in the mounting direction.

In the first embodiment illustrated in FIGS. 1a to 1d, the curvilinear connecting surface, particularly a spherical surface, is a second connecting surface 7 in connection with the tool holder 3, extending from a ring-like second contact surface, i.e. a front surface, in a direction perpendicular to the mounting direction A and forming part of the outer surface of the tool holder 3, preferably in the mounting direction. With particular reference to FIG. 1c, the tool frame 2 is arranged to surround the second connecting surface 7 in the end of the tool holder 3, the first 6 and second 8 contact surfaces being against each other.

According to the invention, it is advantageous to design the curvilinear surface, i.e. the second connecting surface 7, in a manner that the distance between the radius of curvature r of the curvilinear surface and the center k located on the center line K of the tool holder 3 in the mounting direction and the contact surface, i.e. in the present embodiment the second contact surface 8, fulfills the formula:

$$r^2 = D^2 + d^2,$$

wherein r=the radius of curvature,

D=the radius of the second contact surface 8 perpendicular to the mounting direction A, and d=the distance between the center of the radius of curvature and the second contact surface in the mounting direction A.

Consequently, a curvilinear second connecting surface 7 is formed, extending from the outer edge of the second contact surface 8 at a distance e from the second contact surface in the mounting direction A, being essentially equal to:

$$e = 2*d,$$

wherein d=the distance between the center of the radius of curvature and the second contact surface 8 in the mounting direction A.

To make the fixing mechanism function in a compatible manner, the diameter H of the inlay of the connecting element 4 is substantially H=2*r, preferably H=2*r+Δ, wherein Δ is the fit used and wherein r is said radius of curvature.

It is obvious that both the cross-sectional form of the tool holder 3 at least by the second connecting surface 7 and the cross-sectional form of the connecting element 4 in the tool frame 2 in a direction perpendicular to the mounting direction A, is a circular form. The used fit Δ can be a clearance fit, an interference fit or a pinch fit according to the use of the tool.

FIG. 1b shows the mounting of the tool and its frame 1, 2 in the tool holder 3, wherein the tool frame 2 is moved in an inclined position in relation to the mounting direction A, one edge of the tool holder 3 passing the second connecting surface 7 and drawing the tool frame 2 towards the tool holder 3 by means of clamps 3a fixed in connection with the frame 2 (e.g. groove-nose joint 10a, 10b). The rod-like clamps 3a are thus brought to pass the contact surface 8 in order to fix the groove-nose joint 10a, 10b (FIG. 1a). The tool frame 2 can thus be revolved along the connecting surface 7 forming a spherical curved surface to the position shown in FIG. 1c, where the first contact surface 6 and the second contact surface 8 are in contact with and against each other, ready to receive forces in the mounting direction, the clamp 3a effecting a pressure force between the surfaces 6 and 8, wherein also loads (e.g. torsion) in a direction perpendicular to the mounting direction can be transmitted due to a frictional contact, i.e.

$$F_R = \mu * F_K,$$

wherein $F_R$=the radial force, $\mu$=the friction coefficient effective between the surfaces 6 and 8, and $F_K$=the tractive force of the clamp 3a.

As shown in FIG. 1d, the tool frame 2 is released in reverse order by a propulsive force $F_K$ by the clamps 3a. It should be noted that in the present embodiment, the depth s of the inlay of the connecting element 4 in the mounting direction A, i.e. the distance between the first contact surface 6 and the ring-like end surface 9 of the tool frame 2, is substantially 2*d, wherein d is the distance between the center K of the radius of curvature r and the second contact surface 8 in the mounting direction A.

The clamps 3a, being two or more clamps surrounding the outer periphery of the tool frame 2, comprise a nose 10b provided at their ends and extending in the radial direction towards the tool frame 2. A groove 10a is provided on the outer surface of the frame 2 of the tool 13, surrounding the same and functioning as a mounting element, and having two radial surfaces 11a and 11b, each being in co-operation with the respective radial surfaces 12a and 12b of each nose 10b during mounting of the tool, when it is fixed (11a and 12a in FIGS. 1 a–c) as well as during release (11b and 12b in FIG. 1 d).

Alternatively, with reference to FIG. 2, the fixing mechanism according to the invention can be arranged so that a curvilinear surface, seen in a direction perpendicular to the mounting direction, is formed on the outer surface of the tool frame 2, which is spherical substantially in the mounting direction, wherein the connecting element 4 in the tool holder is a corresponding inlay. Naturally, it is possible to shape both connecting surfaces at least partly curved.

In the embodiment of FIG. 2, the tool frame 2 comprises a tool fixing element 2a, the tool 1 being fixed on the first surface of the same. The second surface of the plate-like fixing element 2a forms partly the first contact surface 6, against which, in turn, a connecting surface element 2b is fixed, whose surface in the mounting direction forms the curved connecting surface 7. The connecting surface element 2b is placed centrally in relation to the first contact surface 6, wherein the connecting surface element 2b is surrounded by the first contact surface 6 in a ring-like manner. In the mounting direction A, a mounting element 13 extends from the connecting surface element, comprising a central arm 13a substantially in the mounting direction, and an extension element 13b at its free end.

The tool holder 3 is at its end provided with a flange-like extension, its end surface forming the second contact surface 8. The tool holder 3 is like a bushing, wherein a clamp 3a is arranged to be movable inside the bushing hole in the mounting direction, receiving a guiding effect from the internal hole of the bushing form of the tool holder 3. The free end of the clamp 3a is provided with an opening-groove system 14, with an opening 14a arranged in the mounting direction to receive the arm 13a of the mounting element 13 as shown in FIG. 2a, wherein the clamp 3a is in the outer position, and the end of the opening-groove system 14 protrudes in the mounting direction A outside the second contact surface 8, wherein the mounting element 13 of the frame 2 can be mounted e.g. from the side in connection with the groove-opening system 14 so that its extension element 13b is placed inside a groove element 14b. The groove element 14b comprises radial surfaces 12a, 12b at the ends of the groove element 14b, perpendicular to the mounting direction A. Thus, according to FIG. 2b, the tool 1 with its frame 2 can be attracted towards the tool holder 3, wherein the connecting surface element 2b is placed inside the bushing form of the holder 3, the inner surface of the same near the end forming thus the second connecting surface 5. The first radial surface 11a of the extension element 13b is at the mounting stage in contact with the first radial surface 12a of the groove element 14. The mounting is effected in a manner presented in connection with blank 1, resulting in a situation shown in FIG. 2c, where in the fixing shown in FIG. 2c, the clamp 3a is driven by a force $F_K$ directed upwards, the contact surfaces 6 and 8 being against each other. The tool 1 is released from the holder in a manner shown in FIG. 2d, wherein the second radial surfaces 11b and 12b of elements 13 and 14 are against each other and the force of the clamp 3a effective in the mounting direction removes the contact surface element 2 from the bushing form of the clamp 3a substantially in the mounting direction A.

With reference to FIG. 3, the frame 2 is fixed to the clamp 3a by means of a ball mechanism 15 or the like placed in the radial direction inside a series of openings 3b in the clamp 3a, wherein at the starting and releasing stages, shown in FIGS. 3a and 3c, the balls 15a or the like can be placed in inlays 16 in the bushing hole of the holder, being thus moved outwards in the radial direction and making it possible for the extension element 13b of the mounting element 13 to pass the balls 15a in the mounting direction A. In the bushing hole of the holder 3, a bushing-like tube forming the clamp 3a is arranged to be movable in the mounting direction A, wherein the mounting of the frame 2 can be started directly according to FIG. 3a by inserting the mounting element 13, including the arm element 13a and the extension element 13b, in the mounting direction A inside the tube form of the clamp 3a, the balls 15a being in connection with the inlays 16 and thus in their outermost position in the plane of the inner surface of the tube form. When the clamp 3a is moved upwards in relation to the holder 3, as shown in FIG. 3b, the balls 15a are placed inside in a direction perpendicular to the mounting direction A and forced in connection with the radial surface 11a of the extension element 13b by the surface of the inner hole of the holder 3, in order to lock and effect the force $F_K$ to the frame 2 in a manner corresponding to that explained above in connection with FIGS. 1 and 2. The frame 2 is released as shown in FIG. 3c by using the face surface 3c of the clamp 3a (corresponding to the radial surface 12b in FIG. 2) to push the contact surface 6 of the connecting surface element 2b which thus forms the second radial surface 11b. The connecting surface 5 in the holder 3 is formed in the connecting element 4 which has a diameter exceeding the bushing hole of the holder 3 where the clamp 3a is movable. Consequently in the embodiment according to FIG. 3, the structure corresponding to the groove-opening system 14 (FIG. 2) is formed to be adjusted in the radial direction according to the movement of the clamp 3a, instead of the solid structure of FIG. 2.

We claim:

1. In combination, a fixing mechanism for a tool for treating a material including machining said material, comprising:

a machine tool;

a tool frame for said tool; and a tool holder;

wherein said tool frame and said tool holder comprise respective connecting surfaces extending substantially along a mounting direction, said tool frame including a first contact surface and said tool holder including a second contact surface, said first and second contact surfaces being oriented substantially in a direction perpendicular to the mounting direction and to be placed against each other when said tool is in operation for transmitting machining force between said tool frame and said tool holder; and wherein at least one of said connecting surfaces being shaped as a spherical surface.

2. Fixing mechanism according to claim 1, wherein said connecting surfaces and said contact surfaces are joined substantially together at their respective edges in both said tool frame and said tool holder.

3. Fixing mechanism according to claim 1, wherein said spherical surface is formed on the outer surface of said tool holder to extend from the outer edge of said second contact surface; and wherein said tool frame comprises a connecting element, said connecting element being a recess.

4. Fixing mechanism according to claim 1, wherein said spherical surface is formed on the outer surface of said tool frame; and wherein said tool holder comprises a connecting element, said connecting element being a recess.

5. Fixing mechanism according to claim 1, wherein the length of the radius of curvature of said spherical surface and the distance between the center (K) of said radius and said second contact surface are calculated according to the formula $$r^2 = D^2 + d^2,$$

where r=the radius of curvature,

D=the radius of said second contact surface perpendicular to the mounting direction (A), and d=the distance between the center of the radius of curvature and the contact surface in the mounting direction (A).

6. Fixing mechanism according to claim 3, wherein the diameter (H) of an inlay of said connecting element is substantially 2*r, and preferably (H)=2*r+A, where r is said radius of curvature of said spherical surface and A is the fit used, such fit including a clearance fit, an interference fit or a pinch fit.

7. Fixing mechanism according to claim 4, wherein the diameter (H) of an inlay of said connecting element is substantially 2*r, and preferably (H)=2*r+A, where r is said radius of curvature of said spherical surface and A is the fit used, such fit including a clearance fit, an interference fit or a pinch fit.

8. Fixing mechanism according to claim 1, wherein said spherical surface extends from said first contact surface in the mounting direction (A) substantially at a distance (e), where (e) is approximately 2*d, and d=the distance from the center of the radius of curvature to the face surface in the mounting direction (A).

9. Fixing mechanism according to claim 3, wherein said connecting element is a recess with a substantially cylindrical shape whose depth from said second contact surface in the mounting direction (A) is substantially 2*d, where d=the distance between the center (K) of the radius (r) of curvature and said second contact surface in the mounting direction (A).

10. Fixing mechanism according to claim 4, wherein said connecting element is a recess with a substantially cylindrical shape whose depth from the second contact surface in the mounting direction (A) is substantially 2*d, where d=the distance between the center (K) of the radius (r) of curvature and said second contact surface in the mounting direction (A).

11. Fixing mechanism according to claim 1, wherein said tool frame comprises:

a fixing element in which said tool is fixed;

a connecting surface element, placed on the opposite side of said fixing element relative to said tool, having a spherical connecting surface, the contact surface of said fixing element surrounding said connecting surface element; and a mounting element arranged in co-operation with a groove-opening arrangement of a fixing means placed in said holder, said fixing means being movable relative to said holder.

12. Fixing mechanism according to claim 1, wherein said mounting element protrudes from the connecting surface element and comprises an arm element and an extension element.

* * * * *